July 11, 1939.    E. T. FERNGREN    2,165,364
METHOD OF AND APPARATUS FOR COATING ARTICLES BY DIPPING
Filed Jan. 19, 1938    8 Sheets-Sheet 7

Inventor
Enoch T. Ferngren
By Paul M. Phillips
Attorney

Patented July 11, 1939

2,165,364

UNITED STATES PATENT OFFICE 2,165,364

METHOD OF AND APPARATUS FOR COATING ARTICLES BY DIPPING

Enoch T. Ferngren, Little Neck, N. Y., assignor to Fernplas Corporation, Toledo, Ohio, a corporation of Delaware Application January 19, 1938, Serial No. 185,678

20 Claims. (Cl. 91—46)

My present invention relates to a method of and apparatus for sealing containers or coating forms by dipping. More particularly the invention is directed to such a method and to apparatus by which containers, such for example as medicine bottles, to which closures have previously been applied, may be dipped into a pool of a film-forming liquid for the purpose of forming film coatings over the closures and the closed ends thereof. It is further contemplated that the invention may be applied to the dipping to form films on articles other than containers, for example dipping forms, the films being thereafter removed from the forms and used for any desired purpose either in the condition in which they are removed or after other operations have been performed thereon.

Among the objects of my present invention are to provide a method by which sealing film coatings may be formed on a relatively large number of containers or forms, automatically, continuously and in a minimum total time, while still providing a desired relatively long time for the dipping, draining and drying of the coating on each container or form.

A further object of the invention is to provide a method of forming film coatings by dipping in which provision is made for the escape of air, which may adhere as bubbles to portions of the containers or forms to be coated during the immersion thereof, specifically by introducing the containers or forms into a dipping pool with their longer axes inclined to the vertical and to the surface of the dipping pool. By so doing, bubbles of air are permitted easily to escape during the immersion of the containers or forms. The containers are preferably swung to vertical positions during their passage through the dipping pool and are withdrawn therefrom with their longer axes vertical, so as to obtain even film coatings around the sides and ends thereof.

A further object of the invention is to provide a method of dipping containers or forms as aforesaid into a pool of a film-forming liquid, in which there is a circulation of such character as to tend to scavenge air bubbles from the portions of the containers or forms to be coated, adjacent to the point or zone of introduction of the containers or forms into the pool. This circulation preferably includes a rapid relative movement of the film-forming liquid in the pool and the containers or forms at the zone of immersion; while draining of the coating liquid from the containers or forms is assisted by first reducing and finally substantially stopping relative lateral movement between the film-forming liquid and the containers or forms as the latter reach their point of separation from the liquid in the pool.

A further object of the invention is to provide apparatus constructed and arranged to carry out the methods hereinabove outlined.

A further object is to provide apparatus for handling containers or forms to be dipped as aforesaid of such character that the articles may be easily and conveniently handled and may be controlled in their rates of immersion into the pool of coating liquid and of withdrawal from the pool, so that proper drainage of the coating liquid from the containers or forms may be obtained.

A further object of the invention is to provide apparatus for the dipping of containers or forms as aforesaid wherein means are provided for controlling the angular position or attitude of the containers or forms during their immersion into the pool, their movement through the pool and their withdrawal therefrom.

A further object of the present invention is to provide a receptacle for holding a pool of a film-forming liquid into which containers or forms may be dipped as aforesaid, wherein means are provided so that there will be a desired flow or circulation of the coating liquid into and through the pool and an overflow therefrom with a return of the overflowing liquid to the circulating means. The circulating means and the receptacle are preferably so constructed and arranged that a relatively rapid, upwardly moving, submerged current of the film-forming liquid is provided adjacent to the point of immersion of the containers or forms into the pool, coupled with a progressively slower lateral movement of the liquid through the pool in the same direction as that of the movement of the containers or forms therethrough, so that at the point of separation of containers or forms from the liquid in the pool, there will be substantially no relative lateral movement between the containers or forms and the film-forming liquid in the pool.

A further object is to provide a receptacle for a dipping pool wherein there is a circulation into the receptacle and an overflow therefrom and in which provision is made adjustably to control the angular position of the receptacle, so as to control the portion of the brim thereof over which the overflow takes place and also to control the flow through the pool.

A further object is to provide in a dipping pool, into which successive, transversely arranged rows of containers or forms are to be dipped, for the circulation of the film-forming liquid through the pool in such manner that the containers or forms in any transverse row will be given substantially the same treatment.

A further object is to provide in a dipping pool, as above set forth, a brush which is preferably at least partially submerged in the liquid in the pool and is arranged to be engaged by the containers or forms to be coated during their immersion thereinto for the purpose of mechanically scavenging air bubbles from the portions of the containers or forms to be coated by the liquid in the pool. Preferably also this brush is mounted for rotation in the pool and is arranged to be impinged by a circulatory current of the liquid therein flowing in such manner as to tend to rotate the brush.

A further object of the invention is to provide a method by which previously closured containers such as screw capped bottles, having gaps or recesses between the closures and the adjacent parts of the containers, may be sealed by dipping in such manner that the seal-forming liquid will penetrate partly into, but preferably will not fill, the inner reaches of the gaps between the closures and the adjacent parts of the containers. Thus, in the case of screw capped bottles, for example, my method provides for the sealing of such bottles in a way preventing the penetration of the more or less viscid or thick sealing liquid into the threaded portions between the caps or closures and the bottles and thus prevents contamination of the material contained in the containers during both the sealing thereof and in subsequent use.

Other and more detailed objects of the present invention will become apparent from the following specification and appended claims when taken in connection with the accompanying drawings, in which:

Referring now to Figs. 1 to 4 inclusive, the dipping apparatus is mounted upon a base 1 which is supported by suitable legs 2 upon any desired support, such as a floor of a plant in which the device may be used. The base 1 is in the form of a table and has mounted thereon a bracket 3, which is formed with socket portions for rigidly supporting two vertical standards 4. The standards 4 are connected at their upper ends by a rigid cross member 5 suitably secured thereto. Arranged for vertical adjustive sliding movement on the standards 4 is a crosshead 6, a portion of which forms a bearing for a horizontal shaft 7. At its outer end the shaft 7 carries a head 8, which from a broad point of view may be termed a conveying means for carrying the containers to be dipped and coated in a suitable manner. The head 8 is provided with a plurality of radial guideways 9 in each of which is arranged a slide block 10. Secured in each of the slide blocks is a spindle 11, these spindles being secured to the slide blocks as shown by set screws 12.

Figure 1:
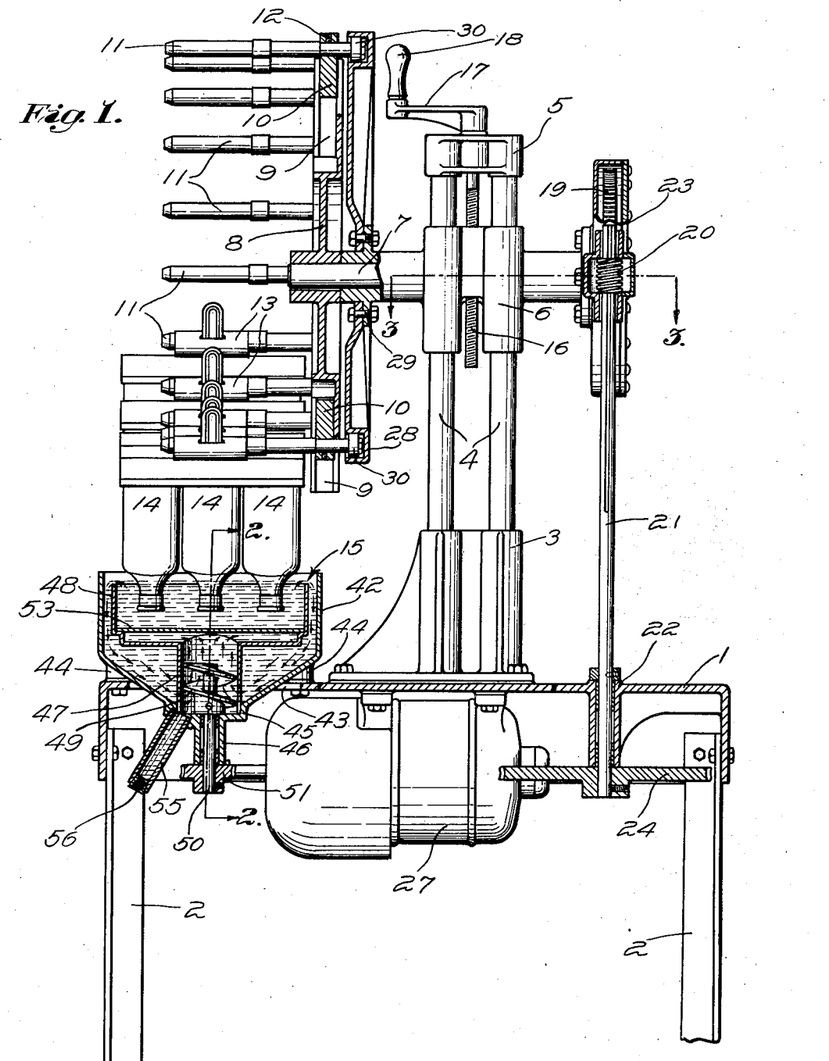
Figure 1 is a view principally in vertical section on the line 1—1 of Fig. 3, showing a dipping apparatus constructed in accordance with my present invention.
Figure 2:
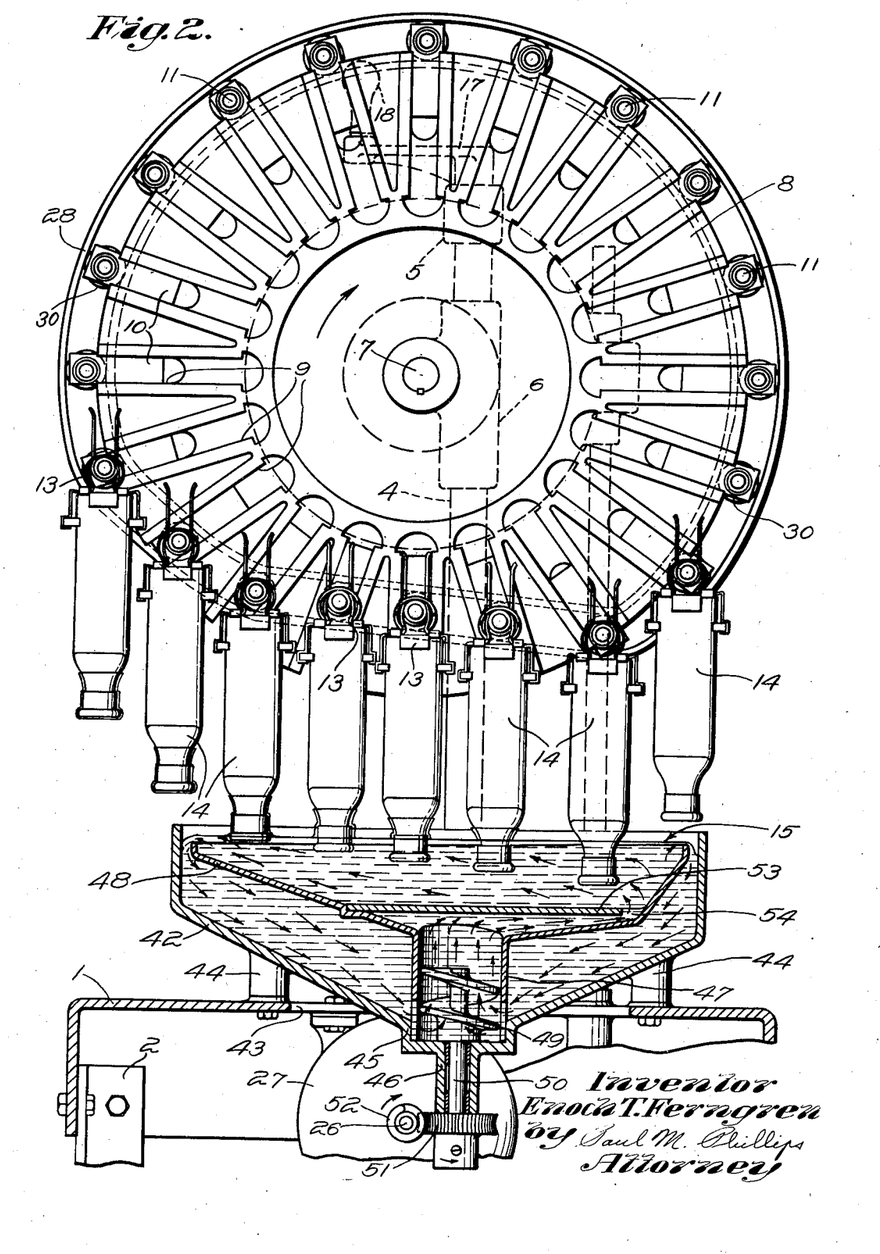
Fig. 2 is a view in elevation of the apparatus as seen from the left of Fig. 1, the dipping pool and portions of the base being shown in vertical section on the line 2—2 of Fig. 1.
Figure 3:
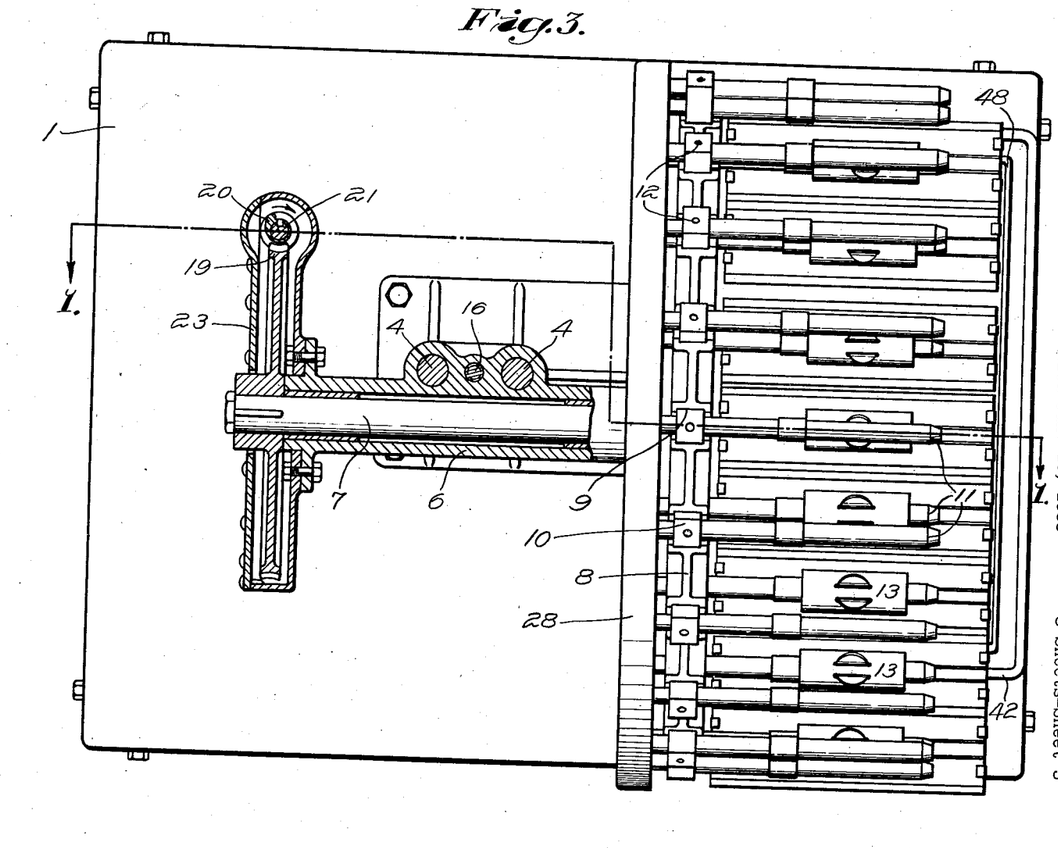
Fig. 3 is a plan view of the apparatus with a portion of the driving mechanism shown in horizontal section on the line 3—3 of Fig. 1.
Figure 4:
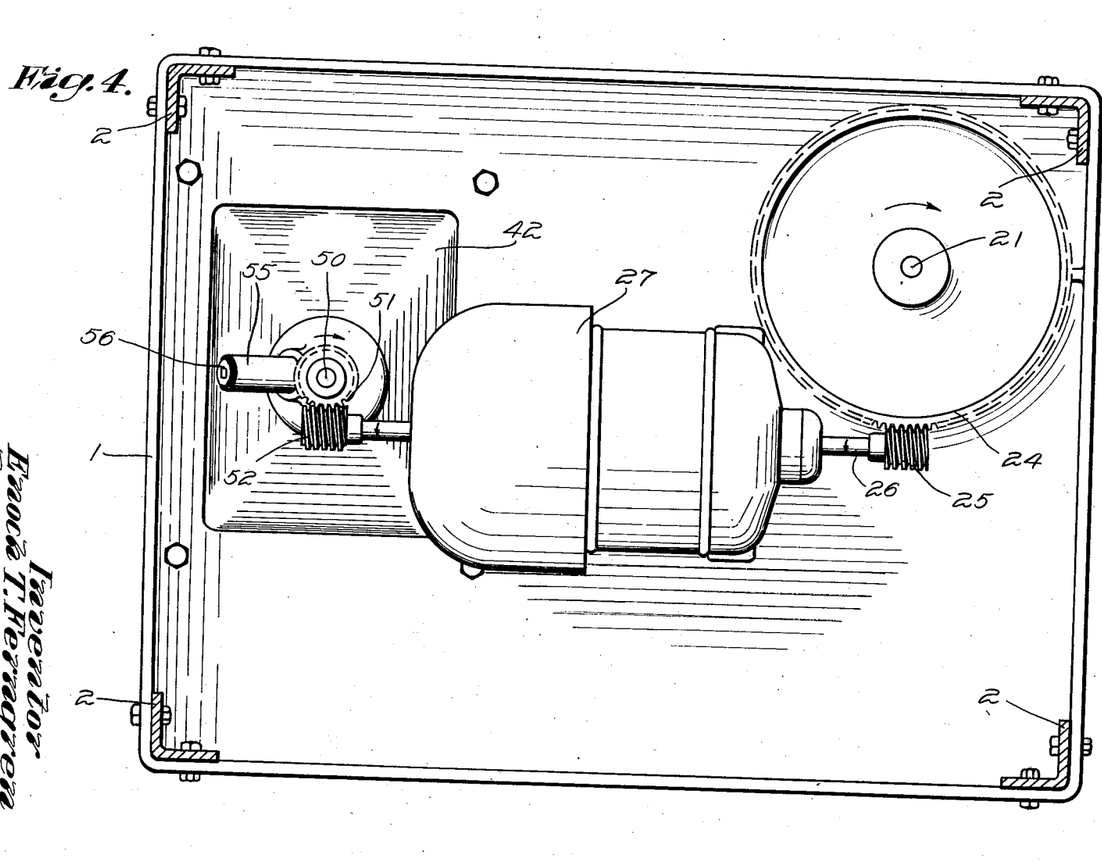
Fig. 4 is a bottom plan view of the base of the apparatus showing the drive for the container handling means and for the pump for circulating the coating liquid in the pool.

I contemplate that each of the spindles 11 may serve as a support for a removable means for carrying one or more containers or forms to be dipped. As shown, there is provided spring clips 13 (Figs. 5 to 8 inclusive), each of which is arranged to be removably supported on any one of the spindles 11. It will be understood, however, that while I have particularly illustrated spring clips for grasping containers to be coated by dipping, I contemplate that any suitable means by which one or more containers or forms may be held and which means may be carried by the spindles 11, or some equivalent means is to be considered within the purview of this invention. Beneath the path of the containers 14, there is a dipping pool, generally indicated at 15, into which the portions of the containers to be coated are dipped, as best illustrated in Figs. 1 and 2.

The crosshead 6 may be vertically adjusted with respect to the stationary parts of the device and also with respect to the dipping pool 15 by means of a screw 16 threaded through the crosshead 6 and swiveled in the cross member 5. At its upper end the screw 16 is provided with a suitable crank 17 having a handle 18.

For rotating the head 8 to move the containers or forms to be coated into and out of the dipping pool, suitable means are provided comprising a worm gear 19 secured to the shaft 7 and meshing with a worm 20, which is splined to a vertically extending shaft 21, the latter being journaled in the base 1 as indicated at 22. The worm 20 is confined against axial movement between suitable portions of a gear case housing 23 carried by the crosshead 6. Thus, when the crosshead is vertically adjusted as above set forth, the worm 20 and the worm gear 19 move therewith, the worm sliding along the shaft 21. At its lower end below the journal bearings 22, the shaft 21 is provided with a worm wheel 24, Figs. 1 and 4, with which meshes a worm 25 mounted on a shaft 26 of a suitable motor 27, the motor being secured to the underside of the base 1.

Means are preferably provided for controlling the rate of introduction of the containers or forms into the dipping pool and what is more important their rate of withdrawal therefrom. This withdrawal rate is predetermined in accordance with the characteristics of the coating liquid and the consequent rate of draining thereof from the containers or forms. For this purpose means are provided for controlling the radial movement of the slide blocks 10 and the spindles 11 in respect to the head 8. I preferably accomplish this by the use of a fixed cam member 28 interchangeably secured as at 29 to a hub portion of the crosshead 6 and providing a closed cam track in which move rollers 30 on the right hand ends, as seen in Fig. 1, of each of the spindles 11. As seen best in Fig. 2, the cam 28 is so designed that the containers are relatively rapidly immersed to their deepest point of immersion in the dipping pool 15 and are gradually withdrawn therefrom at a substantially constant speed. Once the containers are separated from the liquid in the pool, they are relatively rapidly raised to the point occupied by the container at the left in Fig. 2, at which point the clip and containers held therein are adapted to be removed from the machine by the operator. It will be understood that clips filled with containers to be coated will be placed on a suitable spindle at or near the position of the right-hand containers 14 shown in Fig. 2.

Figures 5, 6, 7, 8:
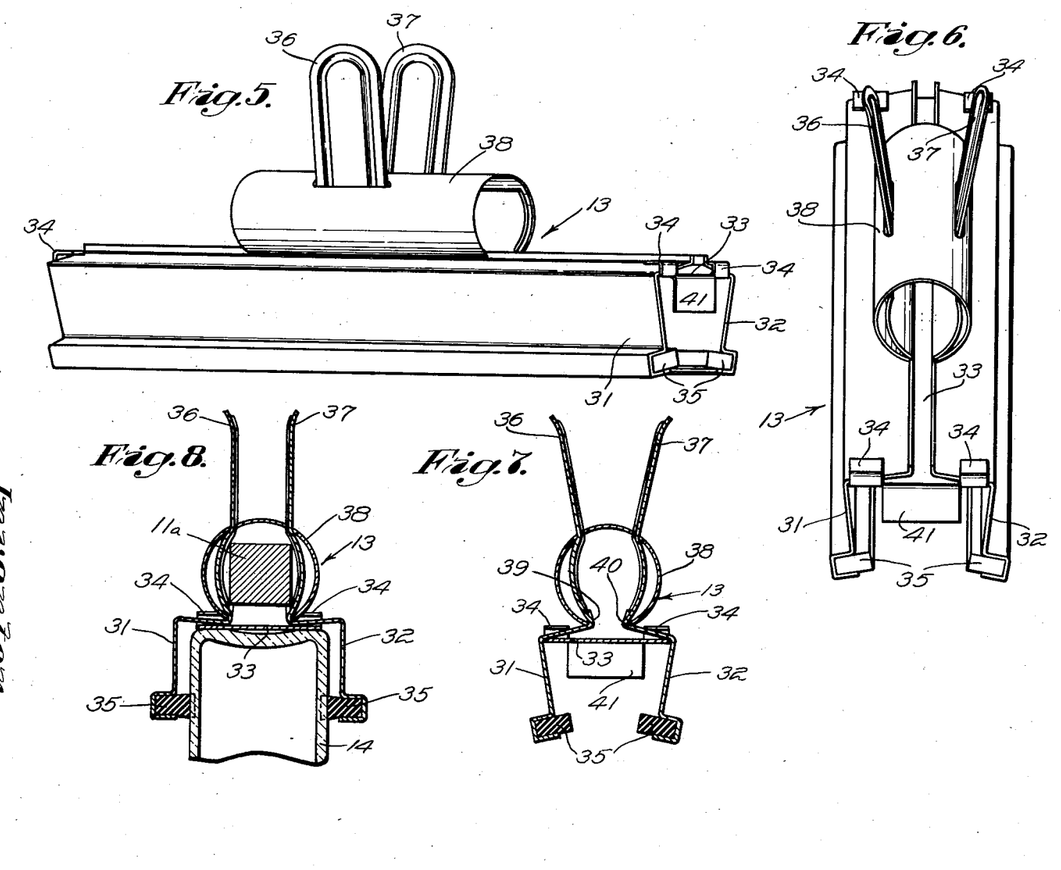
Fig. 5 is a view substantially in perspective illustrating a spring clip for holding a plurality of bottles or other containers or forms to be dipped.
Fig. 6 is another view of this clip showing it at a different angle.
Fig. 7 is a transverse section of the spring clip empty.
Fig. 8 is a similar section illustrating a container grasped by the clip and showing in section one of the spindles on which the clip is adapted to be supported.

Turning now to Figs. 5 to 8 wherein the details of the spring clips 13 are shown, each of these clips comprises a pair of similar side members 31 and 32 between which is disposed a member 33. The member 33 has tabs 34 at its corners turned over and loosely engaging the end portions of the members 31 and 32 so as to hold the parts from dislodgment. The members 31 and 32 are provided with grooved portions at their lower ends for receiving suitable resilient strips 35 of suitable material, such as rubber, for directly engaging the containers, as shown in Fig. 8. The members 31 and 32 are bent inwardly above the member 33 and midway of their ends are provided with upwardly extending portions terminating in finger members 36 and 37 respectively. A semi-cylindrical spring member 38 having apertures through which extend the finger members 36 and 37 engages reentrant portions at 39 and 40 of the members 31 and 32 respectively and urges these members together. The spring member 38 provides the gripping force for holding the cushion strips 35 against the containers held in the clip.

When the clip is in engagement with one or more containers, as shown in Fig. 8, the space between the upwardly extending portions of the members 31 and 32 and within the semi-cylindrical spring member 38 is sufficiently large to accommodate one of the spindles 11. As shown in Fig. 8, however, the spindle there illustrated at 11a is square in cross section, so that the clip 13 is non-rotatably held or supported upon the spindle. When round spindles are used, as shown in Figs. 1 to 4, the spindle may rotate in respect to the clip, so that containers held in the clips in this form of the invention will always be maintained by gravity with their longitudinal axes vertical, as particularly illustrated in Fig. 2.

One or both ends of the member 33 may be provided with a down-turned portion, as illustrated at 41, for preventing movement of containers lengthwise of the clips past the ends thereof. This may assist practically in loading the containers in the clips in order that they be in a uniform position therein and is especially advantageous when handling relatively small containers, such for example as small medicine bottles.

The dipping pool in the form of the invention shown in Figs. 1 and 2 is contained in a structure comprising an outer receptacle 42 which is positioned over and in an aperture 43 in the base 1 and is preferably secured thereto by the provision of suitable studs 44 which may be bolted or otherwise secured to the base 1. As shown, the bottom of the receptacle 42 is inclined downwardly to a cylindrical sump portion 45 centrally of which is a downwardly extending bearing portion 46, as hereinafter set forth. In the cylindrical sump portion 45 is disposed the downwardly extending cylindrical portion 47 of an inner receptacle 48, which is arranged to contain the dipping pool proper. The liquid in the pool and in the receptacle 48 overflows the edge or edges thereof, as hereinafter set forth, and thence flows downwardly between the inner and outer receptacles into the sump, whence it is recirculated again into the inner receptacle through apertures in the portion 47.

Within the downwardly extending portion 47 of the inner receptacle is a pump screw 49 for circulating the liquid from the sump upwardly in the inner receptacle, as hereinafter set forth. The screw 49 is mounted on the upper end of a shaft 50 journaled in the bearing portion 46 of the outer receptacle and carrying beneath this bearing a worm wheel 51. Meshing with the worm wheel 51 is a worm 52, which may also be mounted on the shaft of the motor 27 or may be driven in any suitable manner.

Figure 11:
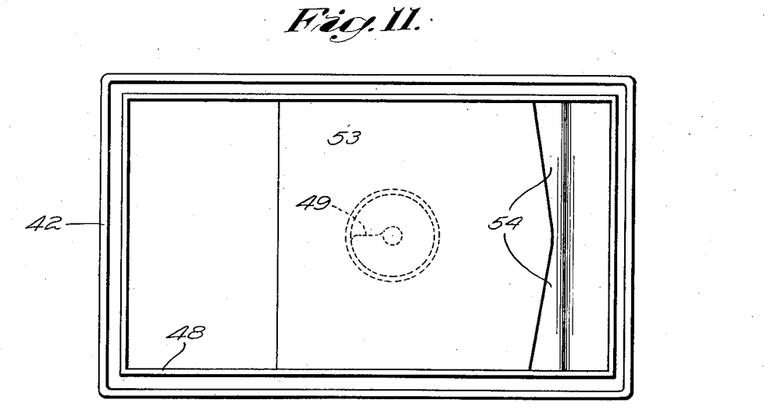
Fig. 11 is a plan view of the receptacle for the dipping pool, the coating liquid being omitted to show the construction of the receptacle.

Within the inner receptacle 48 and directly above the cylindrical portion thereof including the screw 49 is a shield 53, the shape of which is best seen in Fig. 11. This shield is supported on a ledge formed in the walls of the inner receptacle 48 on three sides, as shown, and terminates short of the wall on the right, as seen in Figs. 2 and 11, to provide a passage 54 through which the liquid is circulated by the pump screw 49, as shown by the arrows in Fig. 2. The passage 54 is shaped wider at the sides than at the center, Fig. 11, in order that the flow through the pool in the receptacle 48 be substantially uniform from side to side thereof and to take into account the fact that the pump forces the liquid up centrally of the space beneath the shield 53. This provides for the uniform treatment of all containers or forms in any transverse row being dipped into the pool.

The arrangement is such that the containers or forms are introduced into the pool in the receptacle 48 at the zone thereof above the opening 54, at which point or zone there will be a submerged upwardly moving current of the coating liquid in the pool which will impinge upon the containers or forms just immersed into the pool and will tend to scavange therefrom bubbles of air which might otherwise tend to adhere to the portions of the containers or forms intended to be coated. The liquid in the pool will then flow, as generally indicated by the arrows in Fig. 2, in the same direction as that of the movement of the containers or forms through the pool and at a progressively slower rate as the containers or forms are withdrawn gradually from the pool, due to the fact that the liquid is overflowing the edges of the pool all around, as shown in Fig. 2. As hereinafter set forth in describing the dipping pools shown in Figs. 9 and 12, I prefer to provide an arrangement such that there will be a progressively less relative lateral movement between the containers or forms and the liquid as the containers or forms are withdrawn from the pool, so that at the point where the containers or forms are finally separated from the liquid in the pool, substantially the position of the third container from the left in Fig. 2, there will be substantially no relative lateral movement between the containers or forms and the liquid in the pool adjacent thereto.

For purposes of convenience, the outer receptacle 42 may be provided with a suitable drain pipe 55 secured thereto or integral therewith and provided with a removable plug 56. This is convenient when it is desired to drain one type of coating liquid from the pool, so as to change to another type, as another color etc.

Figure 9:
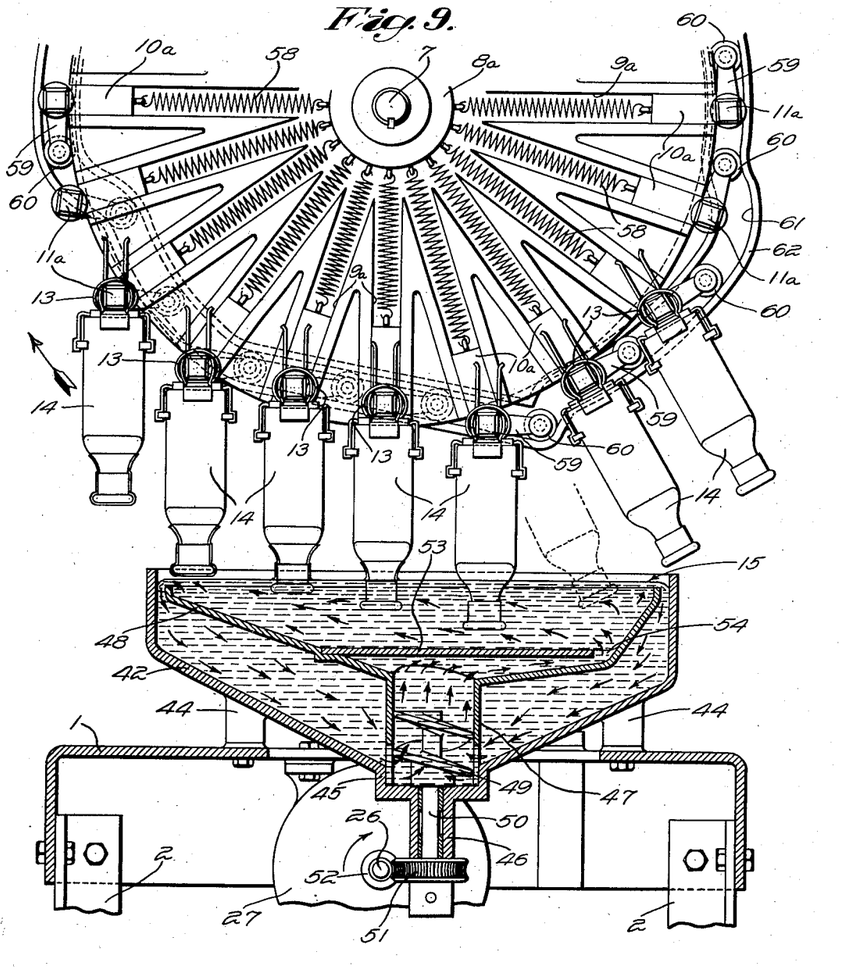
Fig. 9 is a fragmentary view showing a modified form of apparatus, the view being partly in elevation and partly in vertical section, similar to Fig. 2.
Figure 10:
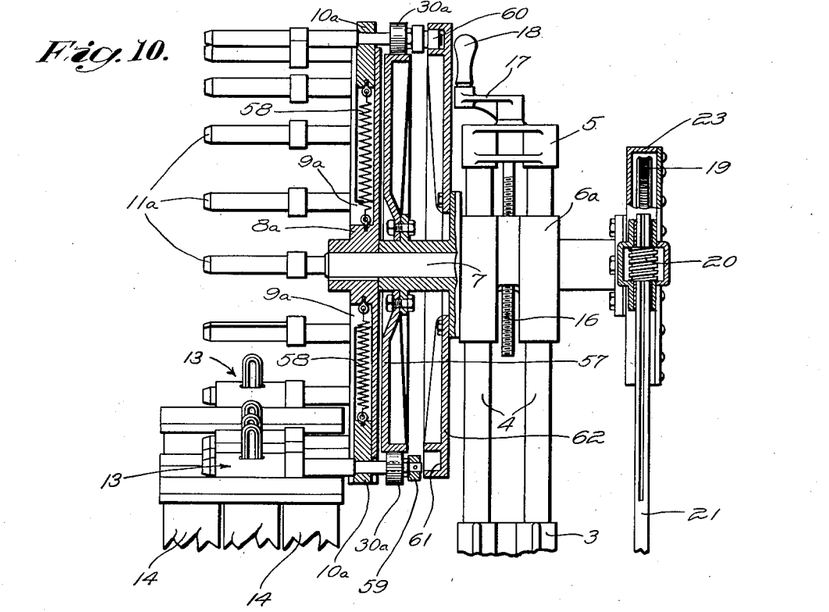
Fig. 10 is a fragmentary view of the form of the apparatus shown in Fig. 9, the view being taken in vertical section similar to Fig. 1.

Referring now to Figs. 9 and 10 in which there is illustrated a modified form of my device, all parts which are the same as the corresponding parts of the form just described will be referred to by the same reference numbers. The device of these figures comprises a suitable base 1 on which is mounted a bracket member 3 carrying standards 4 as above described, these standards in turn carrying a crosshead 6a, which may similarly be vertically adjusted by means of a handle 18. Journaled in the crosshead 6a is a shaft 7 carrying a head 8a. The drive for the shaft 7 may be the same as that previously described.

The head 8a is provided with a plurality of radial guideways 9a somewhat longer than the guideways 9, Fig. 1. In the guideways 9a are mounted slide blocks 10a carrying spindles 11a. The outer end portions of the spindles 11a are rectangular, as shown in Figs. 8 and 9. The spindles 11a are rotatably mounted in the slide blocks 10a; and the clips 13 are nonrotatably supported on the spindles 11a.

In this instance, instead of a closed cam as 28 for controlling the radial movement of the spindles in respect to the head to control the rate of immersion and withdrawal of the containers in the dipping pool, I have provided a cam 57 secured to the hub portion of the crosshead 6a. Rollers 30a freely rotatable on the spindles 11a engage the periphery of the cam 57 and are held in contact therewith by tension springs 58 extending between the slide blocks 10a and suitable anchorages at the inner ends of the slots 9a.

Figure 14:
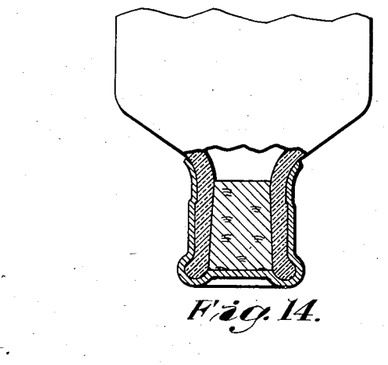
Figs. 14, 15 and 16 show various types of previously closured containers which have been coated in accordance with this invention, the views illustrating the closed and coated ends of the containers in vertical section.

In this form of the invention, it is desired that means be provided for controlling and changing the position of the longitudinal axes of the containers or forms during their introduction into the dipping pool and their movement therethrough. By so doing the containers or forms may be introduced into the pool with their longitudinal axes inclined to the surface thereof so that bubbles of air which might tend to collect on the ends of the containers or forms to be coated may escape therefrom in the direction opposite that of the movement of the containers or forms in immersing them in the liquid in the pool. This is important when the ends of the containers or forms are reentrant as shown for the bottle of Fig. 14. That is, it is desired to introduce the containers or forms into the pool at the angle substantially as shown in Fig. 9 at the right thereof. At the same time, in order that an even coating be provided on the necks or ends of the containers or forms which it is desired to coat, it is preferred that the containers or forms be withdrawn from the pool with their axes vertical. In order, therefore, to control the angle of the containers or forms during their movement into and through the pool, the clips or other means in which they are held are nonrotatably associated with the spindles 11a and means are provided for controlling the angular position of the spindles in respect to the head 8a. For this purpose, each of the spindles 11a is provided at its rear end with a trailing crank arm 59 having a cam roller 60 at its outer end, which travels in a closed cam track 61 of a cam plate 62. The cam plate 62 is suitably secured to a hub portion of the crosshead 6a. Thus, by the provision of a properly shaped cam track 61, I am enabled to control the angular position or attitude of the containers or forms during their movement into and out of the dipping pool.

In order that the device be of general application, it is desired that the cams or cam plates 57 and 62 be removable and interchangeable. For this purpose, the plate forming the cam 57 has a relatively small diameter hole therein and is bolted to a relatively small diameter flange on the crosshead 6a. The hole in the center of the cam plate 62 is larger than the diameter of the flange to which the cam 57 is bolted, so that when the head 8a is removed from the shaft 7 in a suitable manner, the cams may be removed and interchanged with other cams having desired configurations.

Figures 12, 13:
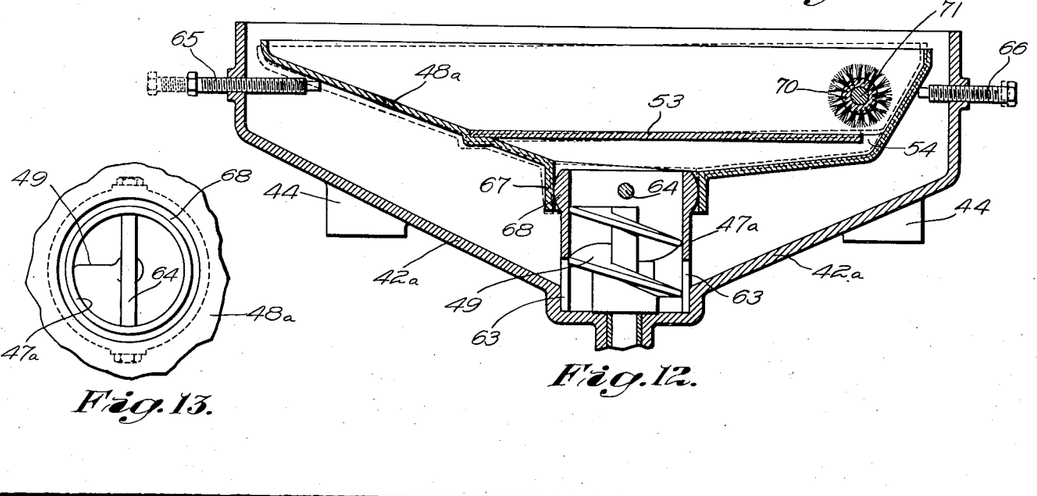
Fig. 12 is a view similar to the lower portion of Figs. 2 and 9, showing a modified form of receptacle for the dipping pool and certain associated means.
Fig. 13 is a fragmentary plan view showing the mounting for the adjustably tiltable receptacle of Fig. 12.

In Figs. 12 and 13, there is illustrated a modified form of receptacle for containing a dipping pool, which for certain purposes may be preferred over the simpler form shown in the previous figures and hereinabove described. The modified construction comprises an outer receptacle 42a which is substantially the same as the receptacle 42, shown in Fig. 2 and above described. Within the cylindrical sump portion of the receptacle 42a is a cylindrical pump casing member 47a, similar to the cylindrical portion 47, but separate from an inner receptacle 48a. The member 47a may be suitably rigidly mounted in the casing 42a and serves as a pump casing for the pump screw 49, which is arranged to be rotated as hereinbefore described. The member 47a has apertures 63, which may be in the form of slots extending upwardly from its lower end, and substantially the same as those in the cylindrical portion of the casing 47 for the purpose of permitting the overflow liquid from the dipping pool in the inner receptacle 48a to flow into the lower end of the pump to be recirculated.

The inner receptacle 48a is pivoted to the member 47a by a horizontal pintle 64, so that this inner receptacle may be adjustably tilted, as between the full and dotted line positions, Fig. 12. For controlling this tilt there are provided two or more screws 65 and 66 threaded through the outer receptacle 42a and bearing against suitable portions of the inner receptacle 48a as shown. Also, in order to prevent liquid passing between the upper end of the member 47a and the adjacent portions of the inner receptacle 48a, which is formed as a short sleeve 67, the upper end of the member 47a is provided with an enlarged rounded portion 68.

By a suitable adjustment of the tilted position of the inner receptacle 48a, it is possible to control the portions of the upper edge of this receptacle over which the liquid will flow during the normal operation of the apparatus. The adjustment is preferably such that the coating liquid will flow through the receptacle in the direction of movement of the containers therethrough and at desired speeds, which will be at first relatively faster in respect to the speed of the movement of the containers or forms, then progressively slower, until at the point where the containers or forms separate or break from the liquid in the receptacle, there will be substantially no relative lateral movement between the liquid and the containers or forms. For this purpose, the liquid will flow over the left-hand edge and parts of the side edges of the receptacle 48a, as seen in Fig. 12.

In some instances, I may also provide in or adjacent to the dipping pool a brush which is wholly or partially submerged in the liquid in the pool and which engages the containers or forms during their immersion for the purpose of mechanically dislodging any bubbles of air on the portions of the ends or other surfaces thereof to be coated. I prefer that this brush be of a rotary substantially cylindrical type and also that it be mounted for free rotation in the pool, as shown at the right in Fig. 12, wherein a brush is generally indicated at 70 and is mounted for free rotation about the horizontal axis of a pintle 71 suitably journaled in the sides of the receptacle 48a. I contemplate also, however, that a brush such as that shown at 70 may be mounted on a shaft which may be driven in either direction and by some suitable power means (not shown). Such a means may be preferable for use with certain types of coating liquids. This power rotating means for the brush is also desirable when the speed of operation of the machine and/or the velocity flow of the liquid in the pool is so slow that the desired scavenging action would not otherwise be effective.

In the position of the parts shown, the brush 70 is adapted to be engaged by the lower ends of containers 14 during their immersion into the pool 15 and may be rotated thereby, while at the same time the brush has a relative movement in respect to the ends of such containers, probably due to friction and/or to the retarding movement of the liquid in the pool. I also contemplate that in the position of the brush 70 as shown, above and adjacent to the opening 54 through which the coating liquid is introduced into the pool from the pump, the flow of this liquid will tend to rotate the brush. This in turn will tend to cause such agitation adjacent to the end portions of the containers 14 being introduced into the pool as to dislodge bubbles therefrom and permit a uniform coating of the containers. This becomes important, particularly when coating the neck ends of stoppered bottles wherein the ends of the stoppers are slightly lower than the plane of the lip of the bottle and air might tend to be trapped in this reentrant portion as above a cork. Such a bottle is shown for example in Fig. 14. According to my present invention, however, the air which might otherwise be trapped in the reentrant portion above a depressed cork or other closure (below it in the inverted positions of the bottles during dipping) may be removed by the means and method herein disclosed so that an even satisfactory seal will be made.

Figure 15:
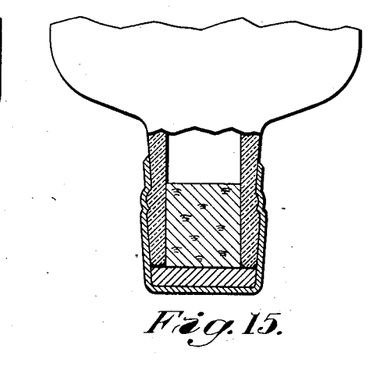
Figure 16:
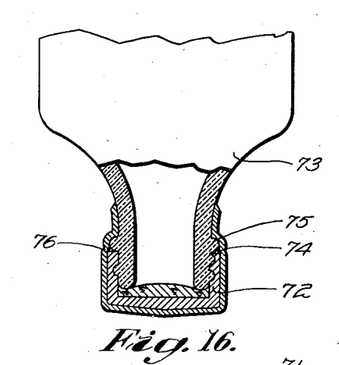

In Figs. 15 and 16, I have shown other types of closures for bottle necks which may be sealed or coated by dipping in accordance with this invention. Fig. 15 illustrates a bottle having a stopper with a cap secured thereto and wherein it is desired to effect a seal at the sides between the cap and lip of the bottle. Fig. 16 illustrates a bottle having a screw type of cap, such as is now in common use for holding medicine. These and many other types of bottles and other containers may be coated by dipping in a suitable liquid according to this invention.

As will be seen from Fig. 16, the cap 72 for the container, here shown as a glass bottle 73, terminates so as to provide an annular gap or recess 74 between the end of the cap and an adjacent portion 75 of the container, here shown as an annular rib or flange. It is desired that the sealing liquid should penetrate partly into this gap, but preferably should not entirely fill it, so as to permit the establishment of an air cushion within the gap 74, which will prevent penetration of the sealing liquid into the spaced formed between the threads of the cap and the threads on the neck of the container. This in practice prevents possible contamination of the contents of the container by the seal-forming liquid and/or its constituent materials including the solvents which are often used (such as acetone, used with cellulose acetate base films). It also permits the stripping of the sealing film from the container at the time the cap is initially removed by the user, leaving not traces of the seal, which is desirable from the point of view of the user.

I prefer to effect such an operation by the means shown in the accompanying drawings and hereinbefore described, including the means by which each container is introduced into or removed forwardly through the dipping pool with its longitudinal axis at an angle which is selected or adjusted by choosing a desired interchangeable cam and is normally an acute angle to the surface of the pool, thus permitting the partial penetration of any type of seal-forming liquid into the annular gap or recess 74. However, in normal operation and due in part to the method of introduction of a container into the pool, and in part to the manner of draining the container with its longitudinal axis vertical during its withdrawal from the pool, an air or other gaseous cushion is confined in this recess under the seal-forming liquid which flows across the recess during the draining off period results in a smooth sealing coat 76 of substantial thickness bridging this gap 74. This coating upon the drying or rigidifying of the film, forms what is in effect a hermetic seal at this point, thus preventing contamination of the material to be contained in the container, while keeping the seal-forming liquid itself out of the space between the container and the closure during the coating operation.

I do not confine myself to any particular type of coating liquid as there are many types known in the art which are satisfactory. One type with which I have attained a marked degree of success is a solution of cellulose acetate in acetone and containing a suitable plasticizer and preferably also a soluble and compatible resin. I do not wish my apparatus or method to be limited in this respect, however. It will be understood, of course, that the speed of the machine and also the shapes of the cams used are preferably selected in accordance with the particular characteristics of the coating liquid chosen for use at any one time, particularly in view of its viscosity and draining characteristics.

While the drawings and the specific disclosure of this application relate to methods and apparatus for dipping bottle necks to coat the previously closed ends thereof, it is obvious that the invention may be equally well applied to the dipping of suitable forms to form coatings thereon from the film-forming material in the dipping pool. Such coating may thereafter be stripped from the forms in any way known to the art and used either in that condition or after being subjected to other manufacturing or shaping operations. The bottle holders particularly disclosed in the present application could be used for holding suitable forms either as shown or with such modification as would normally occur to those skilled in the art, in order to adapt them to a desired use. The appending claims are to be constructed to include the dipping of forms to the same extent as the coating of bottle necks in so far as the particular method steps recited in the claims or the apparatus features thereof are adaptable to such use.

While I have shown and described but a few possible embodiments of my invention and certain possible variations thereof, I do not wish to be limited to any particular form or forms herein shown and particularly described, but merely by the scope of the appended claims, which are to be construed as broadly as the state of the prior art permits.

I claim:

1. The method of applying a film coating to a selected portion of an article comprising the steps of introducing said portion into a dipping pool of a film-forming liquid with the longitudinal axis of the article inclined to the verticle in such a direction as to permit the escape of air from the region adjacent to the end of the immersed portion of the article in a direction opposite that of the movement of the article into the dipping pool, moving the article through the pool while changing the position of the longitudinal axis thereof to a substantially vertical position, and gradually withdrawing the article from the pool while maintaining its longitudinal axis vertical to secure an evenly distributed coating of the film-forming liquid on the coated portion of the article.

2. The method of applying a film coating to a selected portion of an article, comprising the steps of introducing the article into one part of a dipping pool of a film-forming liquid, moving the article through the pool while gradually withdrawing it therefrom, causing a submerged upwardly moving current of the film-forming liquid in the pool to impinge on the portion of the article immersed therein at the portion of the pool into which the article is first dipped, and causing a flow of the film-forming liquid laterally through the pool in the same direction as that of the movement of the article therethrough to reduce the relative movement between the article and the film-forming liquid in the pool during the withdrawal of the article from the pool.

3. The method of applying a film coating to a selected portion of an article, comprising the steps of introducing the article into one part of a dipping pool of a film-forming liquid, moving the article through the pool while gradually withdrawing it therefrom, and causing a flow movement of the liquid in and through the pool in such manner as to provide a substantial relative movement between the article and the liquid in the pool at the portion thereof into which the article is first dipped and a progressively less relative movement between the liquid in the pool and the article as the container is gradually withdrawn from the pool until at the point of separation of the coated article from the liquid in the pool, there is substantially no relative lateral movement between the liquid in the pool and the article.

4. Apparatus for applying film coatings to selected portions of articles, comprising a receptacle for a pool of a film-forming liquid, a head rotatable about a substantially horizontal axis above and adjacent to said receptacle, a plurality of spindles carried by and movable radially in respect to said head, said spindles being arranged substantially parallel to said axis, article supporting means each constructed and arranged to grasp at least one article and to be supported respectively on said spindles, means for rotating said head to move said article supporting means to dip the articles held therein into the pool of film-forming liquid in said receptacle, and means for controlling the radial movement of said spindles in respect to said head to control the rate of immersion and withdrawal of said articles into and out of the pool in said receptacle.

5. Apparatus for applying film coatings to selected portions of articles, comprising a receptacle for a pool of a film-forming liquid, a head rotatable about a substantially horizontal axis above and adjacent to said receptacle, a plurality of spindles carried by said head and movable substantially radially in respect thereto, said spindles having their axes all substantially parallel to the axis of said head, spring clips each constructed and arranged to grasp at least one article and to be detachably supported respectively on said spindles, means for rotating said head to move said clips to dip the articles held therein into the pool of film-forming liquid in said receptacle, and a stationary cam for controlling the movement of said spindles in respect to said head to control the rate of immersion and withdrawal of the articles into and out of the pool in said receptacle.

6. Apparatus for applying film coatings to selected portions of articles, comprising a receptacle for a pool of a film-forming liquid, supporting means adjacent to said receptacle, a head mounted for rotation in respect to said supporting means about a substantially horizontal axis, spindles on said head, article supporting means arranged to be supported respectively on said spindles, means for rotating said head to move the article supporting means on said spindles to dip the articles held therein into the pool of film-forming liquid in said receptacle, and means operable independently of the rotation of said head for vertically adjusting the position of the axis of rotation thereof in respect to said supporting means.

7. Apparatus for applying film coatings to selected portions of articles, comprising a receptacle for a pool of a film-forming liquid, a head rotatable about a substantially horizontal axis above and adjacent to said receptacle and having a plurality of substantially radially disposed guideways therein, slide blocks mounted in said guideways, a spindle secured to each of said slide blocks and arranged substantially parallel to said axis, article supporting means adapted to be carried respectively by said spindles, means for rotating said head to dip selected portions of articles held in said article supporting means on said spindles into the film-forming liquid in said receptacle, and a stationary cam for controlling the radial movement of said slide blocks and thereby for controlling the characteristics of the movement of the articles into and out of the pool of film-forming liquid in said receptacle.

8. Apparatus for applying film coatings to selected portions of articles, comprising a receptacle for a pool of a film-forming liquid, conveying means moving in an orbital path a part of which is adjacent to the pool in said receptacle and is in a substantially vertical plane, means carried by said conveying means for supporting articles to be dipped into the liquid in said receptacle, and means for controlling the angular position of the articles during their movement through the portion of their path adjacent to said receptacle, the last named means being so constructed and arranged that articles may be introduced into the pool of film-forming liquid in the receptacle with their axes at a predetermined angular inclination in respect to the surface of such liquid, have the angular inclinations of their axes changed during the movement of the articles through the pool and may be withdrawn from the pool with their axes at another predetermined angle in respect to the surface of the pool.

9. Apparatus for applying film coatings to selected portions of articles, comprising a receptacle for a pool of a film-forming liquid, conveying means moving in an orbital path a part of which is adjacent to the pool in said receptacle, horizontally disposed spindles carried by said conveying means and arranged with their axes extending transverse of the path of movement of the conveying means adjacent to said receptacle, article supporting means arranged to be non-rotatably carried by said spindles respectively, and cam means for controlling the angular relation of said spindles and hence the angular position of said supporting means and of the articles in respect to the pool of film-forming liquid throughout the passage of the articles through the pool.

10. Apparatus for applying film coatings to selected portions of articles, comprising a receptacle for a pool of a film-forming liquid, a head rotatable about a horizontal axis above and adjacent to said receptacle, spindles rotatably carried by said head with their axes substantially parallel to the axis of rotation thereof, article supporting means adapted to be non-rotatably carried by said spindles, means for rotating said head successively to dip articles held in said article supporting means into and move the articles through a pool of film-forming liquid in said receptacle, and a stationary cam for controlling the angular position of said spindles and the article supporting means carried thereby and hence the position of the axes of the articles during their movement into, through and out of the pool in said receptacle.

11. Apparatus for applying film coatings to selected portions of articles, comprising a receptacle for a pool of a film-forming liquid, a head rotatable about a horizontal axis above and adjacent to said receptacle, spindles rotatably carried by said head with their axes substantially parallel to the axis of rotation thereof and also movable substantially radially in respect to said head, articles supporting means adapted to be non-rotatably carried by said spindles, means for rotating said head successively to dip articles in said article supporting means into and move the articles through the pool of film-forming liquid in said receptacle, a stationary cam for controlling the angular position of said spindles in respect to said head and hence the angular position of the articles during their movement into, through and out of the pool in said receptacle, and a stationary cam for controlling the radial position of said spindles in respect to said head and hence the rates of introduction of the articles into the pool and of the withdrawal of the articles therefrom.

12. Apparatus for applying film coatings to selected portions of articles, comprising a receptacle for a pool of a film-forming liquid, a head rotatable about a horizontal axis above and adjacent to said receptacle and having a plurality of substantially radial slideways therein, slide blocks movable in said slideways, a spindle rotatably mounted in each of said slide blocks with its axis arranged substantially parallel to the axis of rotation of said head, article supporting means each adapted to be non-rotatably carried by one of said spindles, means for rotating said head successively to dip articles in said article supporting means into and move the articles through a pool of a film-forming liquid in said receptacle, a stationary cam for controlling the radial position of said slide blocks and spindles in respect to said head, rollers on said spindles for engaging the outer periphery of said cam, means resiliently urging said slide blocks radially inwardly of said head to retain said rollers against said cam, a crank arm having a roller at its outer end on each of said spindles, and a closed cam for receiving the last named rollers for controlling the angular position of said spindles in respect to said head and hence the angular position of the articles during their movements into, through and out of the pool in said receptacle.

13. In an apparatus for applying film coatings to selected portions of articles, a receptacle for a pool of a film-forming liquid, means for moving articles into, through and out of a pool of film-forming liquid in said receptacle, means associated with the portion of said receptacle into which the articles are first introduced for causing in this portion of the pool in the receptacle a submerged upwardly moving current of the film-forming liquid of the pool to impinge on the articles as they are introduced into the pool, said means for causing the current in the pool and the construction and arrangement of said receptacle being such that the liquid in the pool will flow in the direction of movement of the articles at a horizontal speed faster than that of the articles intermediate the points of introduction and withdrawal of the articles into and out of the pool and at substantially the same lateral speed at the point of separation of the articles from the liquid in the pool.

14. In an apparatus for applying film coatings to selected portions of articles, an outer receptacle for a film-forming liquid, an inner receptacle within said outer receptacle adapted to contain the film-forming liquid which overflows into said outer receptacle, pump means for circulating the film-forming liquid from the outer receptacle into said inner receptacle, the passage from said pump means to said inner receptacle being so constructed and arranged that the film-forming liquid is introduced into said inner receptacle as a submerged, upwardly moving current directed at the portion of the pool in said inner receptacle into which articles to be coated are first introduced and the liquid will then flow laterally from the zone of introduction thereof in the inner receptacle in the direction of movement of the articles therethrough but at a more rapid rate, gradually decreasing in respect to the rate of movement of the articles, until at the point of separation of the articles from the liquid of the pool, there will be substantially no relative lateral movement between the articles and the liquid in the pool, and means for moving articles to be coated into, through and out of the pool of film-forming liquid in said inner receptacle.

15. In an apparatus for applying film coatings to selected portions of articles, means for dipping successive, transversely arranged rows of articles into a film-forming liquid in a pool thereof, a receptacle for containing the pool of film-forming liquid and over a part at least of the peripheral edge of which the liquid is adapted to flow, a pump for circulating the liquid overflowing the edge of said receptacle and reintroducing it into the receptacle from the bottom upwardly adjacent to the portion of the pool into which each row of articles is first introduced, said receptacle being so constructed and arranged that the liquid flows from this portion of the pool generally longitudinally thereof in the same direction as the movement of the articles therethrough, and means associated with said receptacle for providing a substantially constant flow laterally of the pool so that all articles in each transverse row may be given substantially the same treatment during their immersion in the film-forming liquid in the pool.

16. In an apparatus for applying film coatings to selected portions of articles, means for dipping the portions of articles to be coated into a pool of a film-forming liquid, then for moving the articles laterally through the pool and for withdrawing them therefrom, a receptacle for containing the pool of film-forming liquid, pump means for causing a flow of the film-forming liquid upwardly into said receptacle so that the liquid will overflow the upper edge of said receptacle, means for returning the liquid overflowing the upper edge of said receptacle to said pump means, and means for angularly adjusting the position of said receptacle to control the portion of the upper edge thereof over which the liquid will flow.

17. In an apparatus for applying film coatings to selected portions of articles, a receptacle for a pool of a film-forming liquid, means for introducing the portions of articles to be coated into the pool of liquid in said receptacle and for moving the articles through the pool and withdrawing them from the pool, and a brush arranged in a predetermined position in respect to said receptacle so as to be at least partially submerged in the liquid in the pool therein and so as to be impinged by portions of articles to be coated as the articles are introduced into the pool for mechanically dislodging bubbles of air adhering to portions of the articles intended to be coated by the film-forming liquid.

18. In an apparatus for applying film coatings to selected portions of articles, a receptacle for a pool of a film-forming liquid, means for introducing the portions of articles to be coated into the pool of liquid in said receptacle and for moving the articles through the pool and withdrawing them from the pool, a substantially cylindrical brush submerged in the liquid in and mounted for free rotation in respect to said receptacle with its axis of rotation arranged transverse of the path of movement of articles through the pool in said receptacle for engaging said articles and dislodging from the portions thereof to be coated any bubbles of air which might tend to interfere with the desired coating thereof, and means for circulating the film-forming liquid in the pool, the last named means being so constructed and arranged that the current of liquid in the pool impinges on the brush in such manner as to tend to rotate it.

19. The method of applying a sealing film coating to the end of a container to which a closure has previously been applied and which has a gap or annular recess between the closure and an adjacent part of the container, which comprises the steps of introducing the closured end of the container into a pool of a seal-forming liquid with the longitudinal axis of the container at an acute angle to the surface of the pool and thereby assisting the flowing of the seal-forming liquid into the gap or annular recess adjacent to the closure, and withdrawing the closured end of the container from the pool with the axis of the container substantially vertical while draining the seal-forming liquid uniformly from the dipped end of the container so as to cause a draining flow of the seal-forming liquid across the gap or annular recess and thereby forming a sealing wall bridging the gap or recess.

20. The method of applying a sealing film coating to the end of a container to which a closure has previously been applied and which has a gap or annular recess between the closure and an adjacent part of the container, which comprises the steps of introducing the closured end of the container into a pool of a seal-forming liquid with the longitudinal axis of the container at an adjusted angle to the surface of the pool and thereby coating the closured end portion of the container in such manner as to bridge across said gap or annular recess and to trap a gaseous medium therein, and withdrawing the closured end of the container from the pool to cause the liquid to flow uniformly downwardly at all points around the dipped end of the container so as to cause a draining flow of the seal-forming liquid equally at all points across the gap or annular recess, and thereby forming a sealing wall bridging said gap or recess.

ENOCH T. FERNGREN.